(12) United States Patent
Singh et al.

(10) Patent No.: US 8,612,891 B2
(45) Date of Patent: Dec. 17, 2013

(54) SYSTEM AND METHOD FOR REWARDING A USER FOR SHARING ACTIVITY INFORMATION WITH A THIRD PARTY

(75) Inventors: Vik Singh, San Jose, CA (US); Su-Lin Wu, San Carlos, CA (US); Tom Chi, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 183 days.

(21) Appl. No.: 12/706,641

(22) Filed: Feb. 16, 2010

(65) Prior Publication Data
US 2011/0202881 A1    Aug. 18, 2011

(51) Int. Cl.
*G06F 3/048*    (2013.01)

(52) U.S. Cl.
USPC .......................................................... 715/833

(58) Field of Classification Search
USPC .......................................................... 715/833
See application file for complete search history.

(56) References Cited

U.S. PATENT DOCUMENTS

| | | | | |
|---|---|---|---|---|
| 5,615,347 A * | 3/1997 | Davis et al. | ................... | 715/833 |
| 6,954,728 B1 * | 10/2005 | Kusumoto et al. | ........... | 705/14.4 |
| 7,797,168 B2 * | 9/2010 | Kusumoto et al. | ............. | 705/1.1 |
| 7,996,264 B2 * | 8/2011 | Kusumoto et al. | ......... | 705/14.16 |
| 8,127,365 B1 * | 2/2012 | Liu et al. | ......................... | 726/26 |
| 2001/0032115 A1 * | 10/2001 | Goldstein | ....................... | 705/10 |
| 2002/0111816 A1 * | 8/2002 | Lortscher et al. | .................. | 705/1 |
| 2004/0088219 A1 * | 5/2004 | Sanders et al. | ................... | 705/14 |
| 2005/0216346 A1 * | 9/2005 | Kusumoto et al. | .............. | 705/14 |
| 2008/0195462 A1 * | 8/2008 | Magdon-Ismail et al. | ...... | 705/10 |
| 2008/0306817 A1 * | 12/2008 | Amidon et al. | ................. | 705/14 |
| 2008/0307066 A1 * | 12/2008 | Amidon et al. | ............... | 709/217 |
| 2009/0063283 A1 * | 3/2009 | Kusumoto et al. | .............. | 705/14 |
| 2009/0132366 A1 * | 5/2009 | Lam et al. | ....................... | 705/14 |
| 2009/0248514 A1 * | 10/2009 | Pang et al. | ...................... | 705/14 |
| 2010/0241501 A1 * | 9/2010 | Marshall | .................... | 705/14.13 |
| 2010/0306834 A1 * | 12/2010 | Grandison et al. | ................ | 726/7 |
| 2011/0126290 A1 * | 5/2011 | Krishnamurthy et al. | ...... | 726/26 |
| 2011/0138480 A1 * | 6/2011 | Janoulis et al. | ................ | 726/28 |

* cited by examiner

*Primary Examiner* — William Bashore
*Assistant Examiner* — Henry Orr
(74) *Attorney, Agent, or Firm* — Pillsbury Winthrop Shaw Pittman LLP

(57) ABSTRACT

The present invention provides a method and system for receiving a user privacy preference that indicates an amount of activity information that the user is willing to share in response to a reward, a value of the reward related to a degree of the user privacy preference. The method and system includes setting a privacy setting for the user based on the received user privacy preference. The method and system further includes tracking web browsing activity of the user during one or more web-browsing sessions based on the privacy setting to generate user activity information. The method and system further includes sending the user activity information and providing a reward to the user based on the user activity information sent.

17 Claims, 5 Drawing Sheets

SYSTEM AND METHOD FOR REWARDING A USER FOR SHARING ACTIVITY INFORMATION WITH A THIRD PARTY

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention described herein generally relates to web analytics and privacy systems. More specifically, the invention is directed towards systems and methods for a user of the system to receive a reward based on tracked browsing history data sent to a third party.

BACKGROUND OF THE INVENTION

The Internet, and specifically the World Wide Web, is used to distribute information such as news, product reviews, and literature to vast audiences. Distributors of this information typically do not charge a fee, but instead its cost may be underwritten by advertising. As with all advertiser-supported media, advertisers generally want to learn as much as possible about the customer. For example, advertisers like to know audience demographics (e.g., average age, gender distribution, etc.) to more accurately choose appropriate advertisements, while editors like to know audience preferences (e.g., favorite kinds of stories, most-read sections) to create more appealing content. The process of measuring, collecting, analyzing, and reporting of Internet data for the purposes of understanding and optimizing web usage is called web analytics.

There are several existing mechanisms in HTTP to support the collection of customer information. For example, one method of collection utilizes the voluntary registration process, which may involve a customer providing personal information in exchange for access to otherwise restricted media content. Passive tracking may also be used as an alternative or supplement to the voluntary registration process.

Passive tracking may provide information about the requests made by a customer accessing a web site, the information including such things as pages visited, data entered, and links clicked. There exists in the art well known methods and systems for passively tracking user activity. For example, the products SiteCatalyst® by Omniture, Inc. and Analytics™ by Coremetrics collect data regarding user interaction with web site data, and transmit that activity data to an interested party.

A program embedded into a webpage may be used to passively track user activity. For example, U.S. Pat. No. 6,763,386 entitled "Method and Apparatus for Tracking Client Interaction with a Network Resource Downloaded from a Server," describes one method of embedding a program into a webpage to passively track user activity. When a user loads a webpage the program loads along with the other web components (graphics, text, video, etc.). During a web browsing session, the program monitors the user interaction with web components and reports the interaction data to a third party. Another example of passive tracking may consist of a program embedded into the user's web browser. The embedded program allows for activity tracking anytime a user interacts with the web browser or web pages accessed by the web browser. One example of an embedded program is described in U.S. Pat. No. 7,590,568 entitled "Content Display Monitor."

Yet another example of passive tracking may consist of a "cookie" installed on a user's computer. One example of a cookie being used to passively track user activity is discussed in U.S. Pat. No. 6,766,370 entitled "Internet Website Traffic Flow Analysis Using Timestamp Data."

Such passive tracking usually involves a collection of the user's information, and may include any number of user actions on-line or over a computer network, such as viewing a web page, clicking on an advertisement, performing a web search based on one or more keywords, etc. After a collecting entity receives this data advertisements may then be targeted or displayed to such users based on this collected data.

Users have become aware of passive tracking means to gather information about them. In an effort to protect their own privacy, users routinely block the passive tracking and reporting of their activity, thus severing a crucial means for advertisers and other businesses to obtain information about users. As a result of users blocking passive tracking and reporting, advertisers and other businesses lose the ability to improve products and offerings.

There exists a need to motivate users to allow tracking and reporting of their activity to interested third parties.

SUMMARY OF THE INVENTION

The present invention is directed towards a system and method for tracking user events during a web browsing session, reporting those events or a subset of those events to a third party, and rewarding a user based on the events reported to the third party. In one embodiment, the method provides a profile database to store user privacy preferences, an activity module to track user events during a web browsing session, a filter module to filter the user events collected during a web browsing session, and a reward database to receive filtered user events collected during a web browsing session. The method further allows for filtering the user events based on either: a previously saved privacy preference, or a user selection of which individual events to filter. In one embodiment the collected user events may be stored on the user's device. In another embodiment the collected user events may be stored on a server. The user events are filtered according to a user's privacy preference or a user's selection, and the filtered events are sent to a third party. The user receives a reward for sending user events to the third party, the reward may be based on the amount or types of user events that the user allows to be sent to the third party.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration of specific embodiments in which the invention may be practiced. It is to be understood that other embodiments may be utilized and structural changes may be made without departing from the scope of the present invention.

Figure 1:
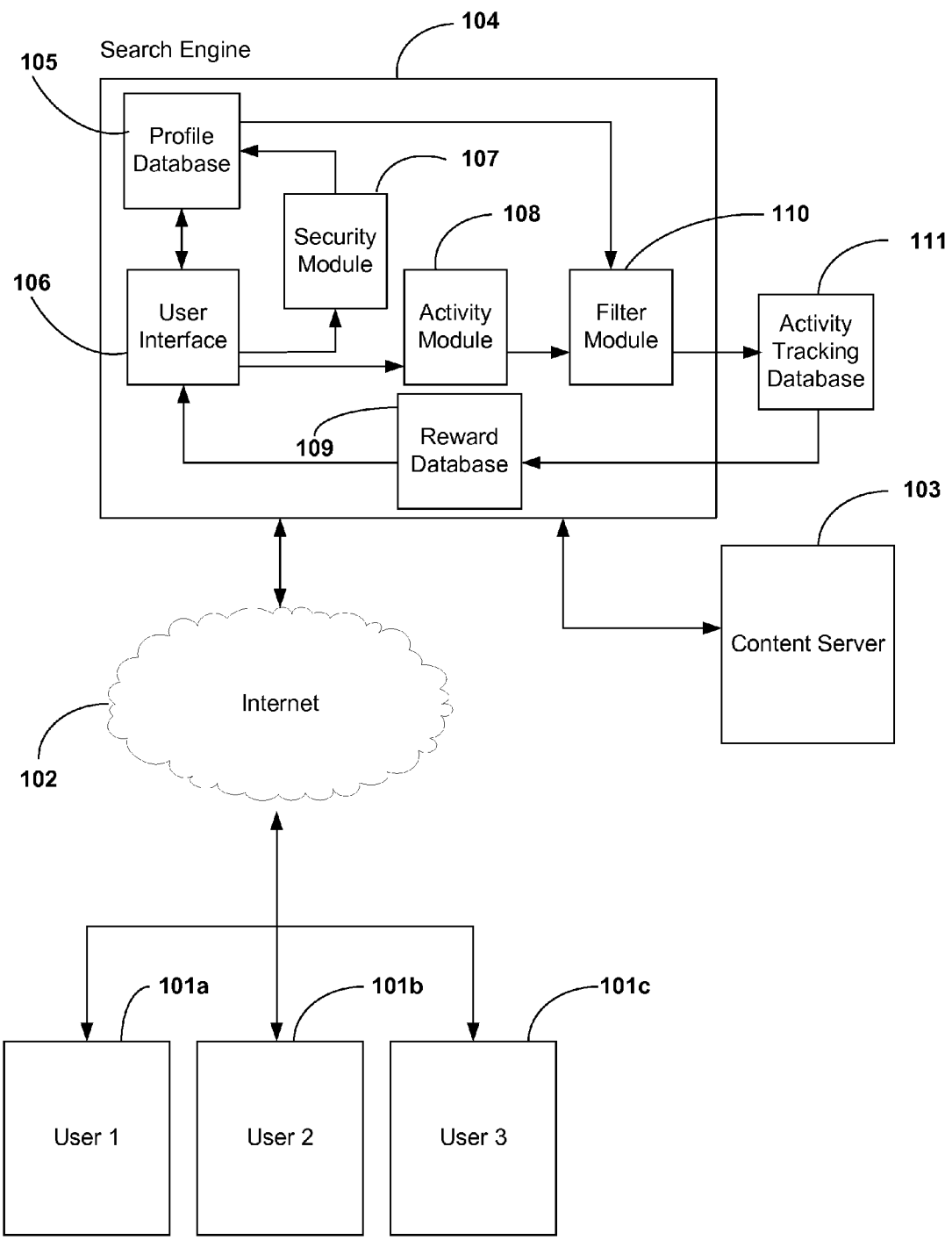
FIG. 1 presents a block diagram depicting a system implementing an embodiment of the present invention.

FIG. 1 presents a block diagram of a system illustrating one embodiment of a method for rewarding a user for sharing activity information with a third party. As the embodiment of FIG. 1 illustrates, a plurality of client devices 101a, 101b, and 101c are electronically connected to Internet or network 102. Internet 102 is further electronically connected to a search engine or data aggregator 104. Search engine 104 includes a plurality of hardware and software components including a profile database 105, a user interface 106, a security module 107, an activity module 108, a reward database 109, and a filter module 110. Search engine 104 is further electronically connected to an activity tracking database 111. The search engine 104 is further electronically connected to content server 103.

Although illustrated as single, discrete components, alternative embodiments exist wherein the illustrated devices may be integrated and/or distributed across multiple hardware devices. Additionally, the devices may be distributed geographically in addition to physically. The search engine 104, client devices 101a, 101b, and 101c, and content server 103 may be any suitable physical processing device performing processing operations as described herein, in response to executable instructions. The data store elements 105, 109, and 111 may be any suitable type of storage device operative to electronically store data therein.

In the illustrated embodiment, a plurality of client devices 101a, 101b, and 101c are operative to transmit and receive data from search engine 104 via the Internet 102. Search engine 104 aggregates data, and may comprise a plurality of hardware and software devices operative to handle requests such as HTTP requests or various requests following other protocols. Search engine 104 and client devices 101a, 101b, and 101c are operative to transmit and receive information to and from content server 103. In the illustrated embodiment, search engine 104 may receive a request from client devices 101a, 101b, and/or 101c to access user interface 106. User interface 106 may be a web page containing a log in prompt or any other means for associating a user with the user's profile.

In response to accessing user interface 106, the search engine 104 may transmit a web page to the client devices 101a, 101b, and 101c prompting the user of the respective client device to enter credentials to access the user's profile. A user's profile may be a data structure that stores information about the user such as a username, password, and any additional preferences selected by the user. The user's profile may be stored in profile database 105.

The user interface 106 may include a plurality of graphical user interface ("GUI") elements as well as various application logic components implemented in a client-side programming language such as JavaScript, ActionScript via Flash, or any other client-side programming language known in the art.

The user interface 106 may also be a web page downloaded to the client computer 101a, 101b, or 101c by a user of the system.

Upon access of the user interface 106, a user of client device 101a, 101b, or 101c submits credentials such as username and password to the security module 107. Security module 107 may be program code to verify a username and password and allow a user to access a user profile previously saved on the search engine 104. If the user submits verifiable credentials, the security module 107 accesses the user's profile in profile database 105. The user submits or has previously submitted privacy preferences, which are stored as privacy settings in profile database 105. Privacy preferences may include definitions of the amount or type of browsing activity a user of the system is willing to share with a third party. For example, a user deeply concerned about his privacy may choose to restrict the sharing of all data with third parties. Alternatively, a user who is not concerned with his privacy may choose to allow all of his activity information to be sent to third parties. Whereas, in the system described herein, the sharing of user information includes the addition of an incentive for greater degrees of rewards based on willingness to share greater degrees of tracking information.

The user's selected privacy preferences may be stored in the profile database 105 and associated with the user. Alternatively, the user's selected privacy preference may be stored in a cookie on the user's client device 101a, 101b, or 101c, which would allow all web sites, or all tracking programs, to access the user's selected privacy preferences. During a web browsing session by client device 101a, 101b, or 101c, content server 103 may send content such as web links, text, movies, and advertisements to client devices 101a, 101b, and 101c in the form of a web page.

During the web browsing session, a user of the client device interacts with content delivered through the user interface 106 or from content server 103. The interaction with content data by client device may include user "events" which are based on user inputs. User events can include: selecting a link, inputting data from a keyboard or mouse, mousing-over an object, scrolling to view the web page, or any other interaction with the content contained on the web page.

During a web browsing session user interaction with web content may be monitored by different tracking methods known in the art. For example, a JavaScript program downloaded with other web page components may track user activity. Alternatively, a browser plug in may operate to track user activity anytime the web browser is run on the client device 101a, 101b, or 101c. It is noted that the tracking of activities is not explicitly limited to a search engine, such as the engine 104, but may also be readily disposed in other suitable manners, such as for example a toolbar interface usable with a web browser. The illustrated search engine 104 is for illustrative purposes and not a limiting description of means for tracking user activity.

Tracked information may be sent to activity module 108. Activity module 108 may be program code to collect user events and store the events in a database. Activity module 108 associates a user of the client device 101a, 101b, or 101c with the user's tracked activity. Activity module 108 may also organize user events based on the type of event, web page on which the user event took place, date, time or any other suitable type of information.

The activity module 108 may also assign a "privacy score" to the user event. A privacy score may be an indication of the sensitivity of a user event. For example, a user performing searching and viewing operations on a medical information website or accessing a financial web location may be deemed highly sensitive events. A user may be embarrassed to have medical information tracked and may be considered about identify theft or fraud issues relating to the financial website. Recognizing the highly sensitive nature of this information, the activity module 108 may assign this data a score indicating a high sensitivity.

By comparison, if the user is viewing headlines and reading selected stories from a general new web location, this may be activities have very low sensitivity levels. Sensitivity, in one embodiment, relates to the likelihood of the user having comfort in the sharing of knowledge of the tracking of this information. Activity module 108 records user interaction with web content as user activity information ("UAI"). Activity module 108 further sends the UAI to filter module 110.

Filter module 110 is a software component to analyze the UAI and privacy preferences and further send a subset of the received UAI to activity tracking database 111. For example, if UAI has a privacy score indicated by its sensitivity, and the privacy settings indicate a threshold score, the filter module may be operative to sort UAI based on the privacy score and send a subset of UAI to the activity tracking database 111 based on the privacy score. Filter module 110 receives the UAI from the activity module 108 as well as the user's privacy settings from the profile database 105. Filter module 110 may filter the UAI based on the privacy setting to produce information that reflects a corpus of information that a user of the client device 101*a*, 101*b*, or 101*c* is willing to send to a third party collector (not shown).

In an alternative embodiment, all UAI may be stored in a database, and the filter applied before reporting the UAI to a third party, thus allowing a user to change privacy preferences one or more times before filtering the UAI in accordance with the user's privacy preferences.

In another embodiment, the filter module 110 may be downloaded to the client device 101*a*, 101*b*, or 101*c*, and the filtering process may be performed on client device 101*a*, 101*b*, or 101*c*. In yet another embodiment, filter module 110 may operate on a server to select which tracking program to utilize, or which events to track. For example, the user may wish that only mouse clicks are tracked, or that only keyboard inputs are tracked. In one embodiment, filtering can also be based on the activity sensitivity.

The filtered UAI is sent from filter module 110 to activity tracking database 111 to be stored therein. Activity tracking database 111 may be a component of search engine 104, or may reside in a separate location altogether. Activity tracking database 111 then sends the tracked UAI to reward database 109.

Reward database 109 may store reward indicators submitted by third parties such as advertisers. Reward indicators may include information about the amount of UAI a user must share with the party offering the reward in order for the user to receive the award. Reward database 109 may also store UAI sent from activity tracking database 111, or a UAI indicator sent from activity tracking database 111. Reward database 109 may compare either UAI or a UAI indicator with the reward indicator to determine whether a user should receive a reward.

Reward database 109 may also be operative to send the filtered UAI to a third party such as content server 103. Additionally, reward database may send a reward to user interface 106, which notifies the user of client device 101*a*, 101*b*, or 101*c* of a reward received as a result of sending at least some tracked UAI to third party 103. A reward may be sent to client device 101*a*, 101*b*, or 101*c* by a message displayable in the user's web browser. In the alternative, a reward may be sent to the user in e-mail or via any other electronic messaging medium.

Examples of rewards and reward indicators may include incentives, online games, help, or offers of additional rewards. In one embodiment the user receives virtual dollars, which may be redeemable at online retailers. The amount of virtual dollars may be adjusted based on the amount of UAI the user shares with a third party. Furthermore, the reward may be a physical object, such as a check for money or a stuffed animal, delivered to the user after the user sends his UAI to the entity offering the reward. In another embodiment, the reward may include an incentive that alerts the user that sending additional UAI to a third party will result in a reward higher than the award originally offered.

Figure 2:
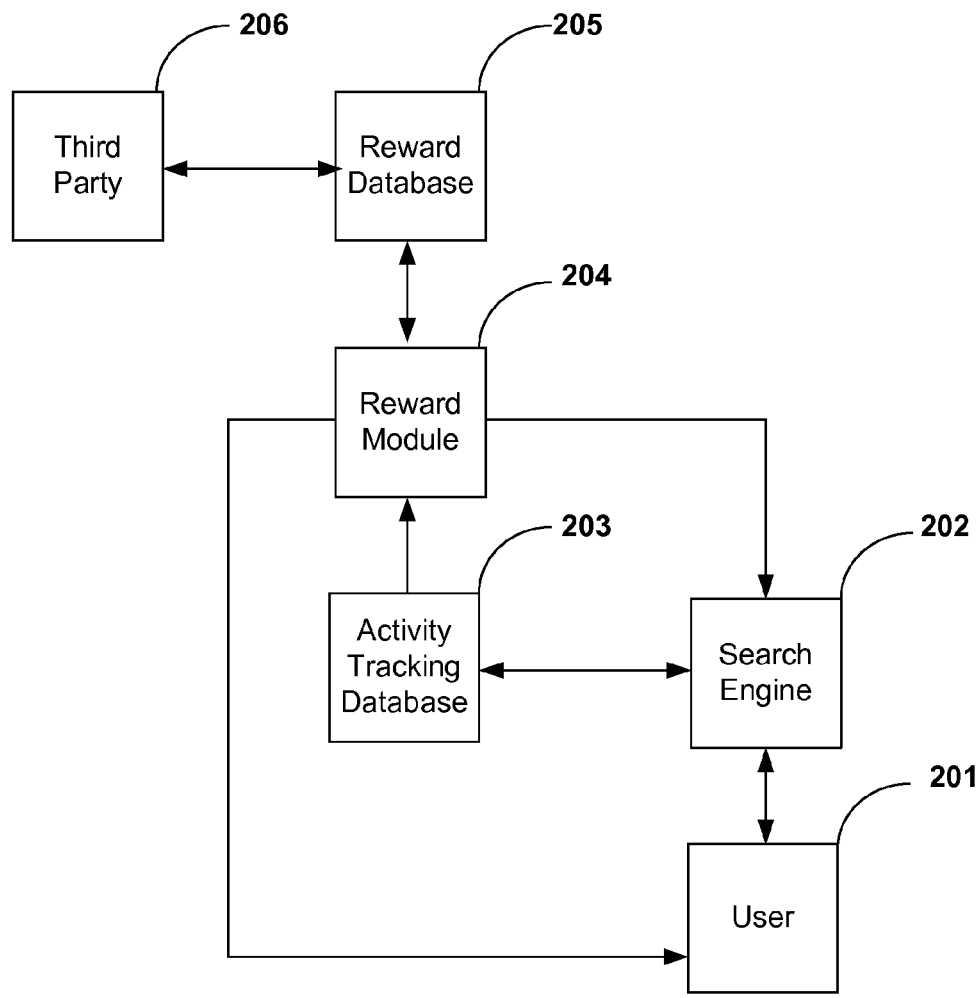
FIG. 2 presents a block diagram further depicting a system implementing an embodiment of the present invention.

FIG. 2 shows an additional embodiment of the invention. FIG. 2 includes user 201, search engine 202, activity tracking database 203, reward module 204, reward database 205, and third party 206.

In FIG. 2, user 201 may access search engine 202 through a web browser commonly known in the art. User 201 sends a privacy preference to search engine 202 based on the amount of UAI user 201 wishes to send to third party 206. User 201 also sends search queries or instructions to search engine 202. Search engine 202 returns content such as web pages and search results including advertisements to user 201.

User 201 interacts with the returned content, and search engine 202 tracks UAI. Search engine 202 may track UAI in accordance with the methods discussed previously. Search engine 202 sends the tracked UAI and the user's privacy preference to the activity tracking database 203. In one embodiment, the activity tracking database 203 filters the UAI in accordance with the user's privacy preference.

Activity tracking database 203 sends the tracked UAI to reward module 204. In one embodiment, reward module 204 sends a reward notice to search engine 202, which sends the reward notice to user 201. In another embodiment, reward module 204 sends the reward notice directly to user 201.

In one embodiment, the amount of the reward ultimately sent to user 201 depends on the amount of tracked UAI that the user is willing to submit to the reward module. For example, if user 201 allows all of his tracked UAI to be sent to the reward module, the reward is greater than if user 201 allows only a small portion of his tracked UAI to be sent to reward module 204.

Reward module 204 receives reward information from the reward database 205. Reward database 205 may have similar characteristics as reward database 109 as illustrated in FIG. 1. Reward database 205 receives the tracked UAI and sends the data to a third party 206. Reward database 205 also receives and stores rewards offered by third party 206. Third party 206 may be an advertiser, or any other entity interested in tracking a user's interaction with online content.

Figure 3:
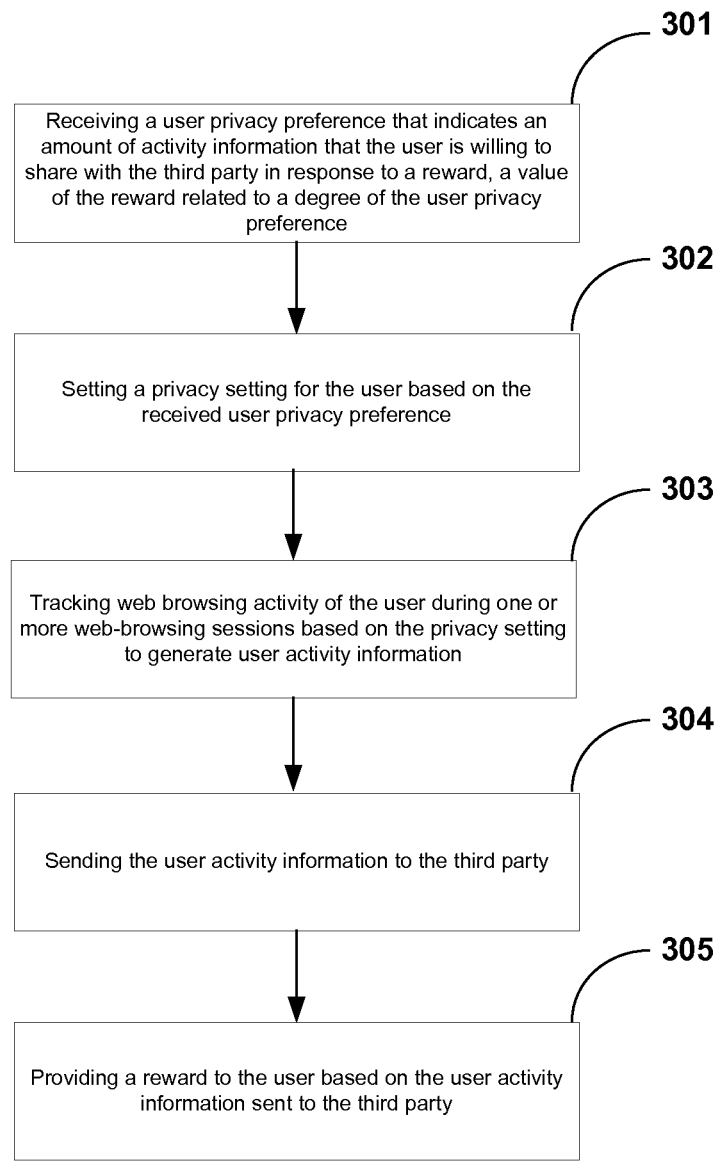
FIG. 3 presents a flow diagram illustrating a method for implementing an embodiment of the present invention.

FIG. 3 illustrates a flow diagram presenting a method for rewarding a user for sharing activity information with a third party according to one embodiment of the present invention. In accordance with the embodiment of FIG. 3, the method may begin by receiving a user privacy preference that indicates an amount of activity information that the user is willing to share with the third party in response to a reward, a value of the reward related to a degree of the user privacy preference, step 301. As used herein, the amount of information can include not only quantity, but quality of information. As described in further detail below, the user can select the privacy setting to reduce the quantity of information, but may be only a higher quality degree of information (e.g. higher degree of security) and as such, the amount of information includes quantity of information and/or quality of information.

Next, setting a privacy setting for the user based on the received user privacy preference is performed in step 302. Next, tracking web browsing activity of the user during one or more web-browsing sessions based on the privacy setting to generate user activity information is performed in step 303.

Next, sending the user activity information to the third party is performed in step 304. Lastly, providing a reward to a user based on the user activity information sent to the third party, step 305.

Figure 4:
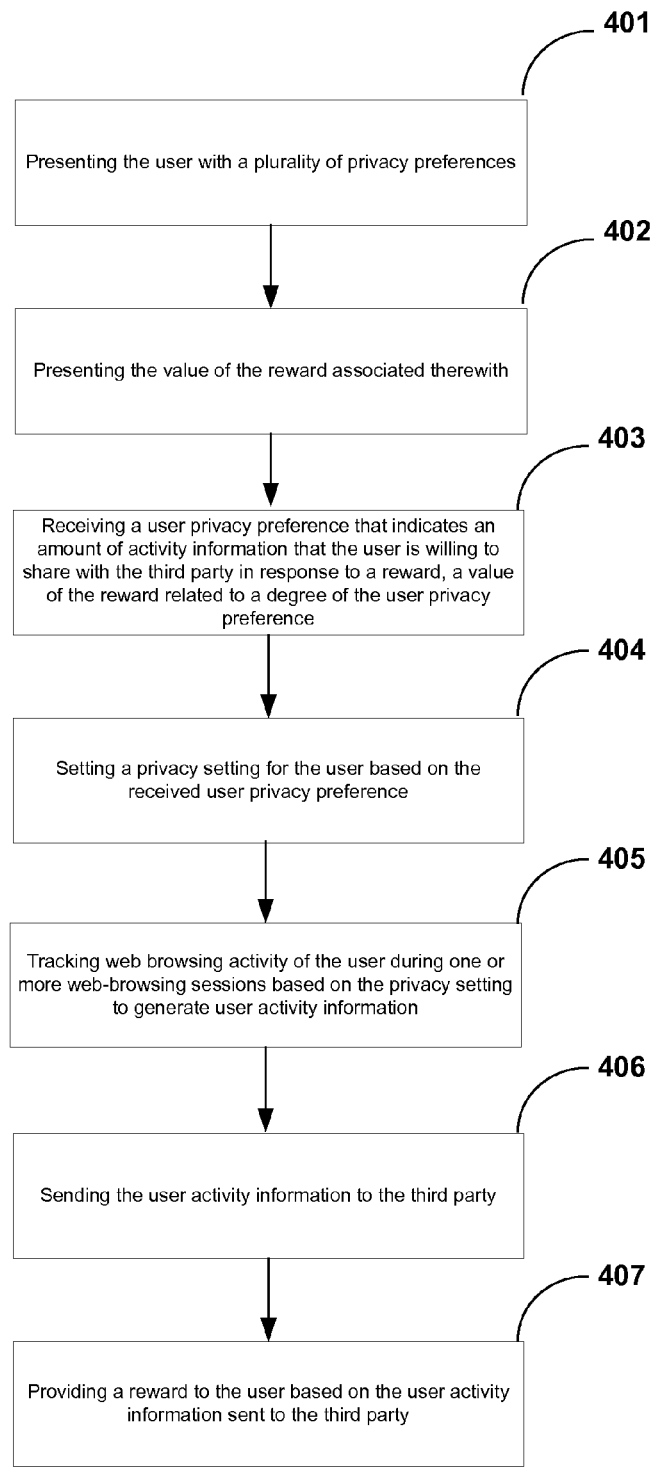
FIG. 4 presents a flow diagram illustrating a method for implementing an embodiment of the present invention.

FIG. 4 illustrates a flow diagram of an additional embodiment of a method for rewarding a user for sharing activity information with a third party. In FIG. 4, the additional embodiment may begin with two steps: presenting the user with a plurality of privacy preferences, step 401, and presenting the value of the reward associated therewith, step 402. The embodiment in FIG. 4 then proceeds with the same steps as shown in FIG. 3.

Figure 5:
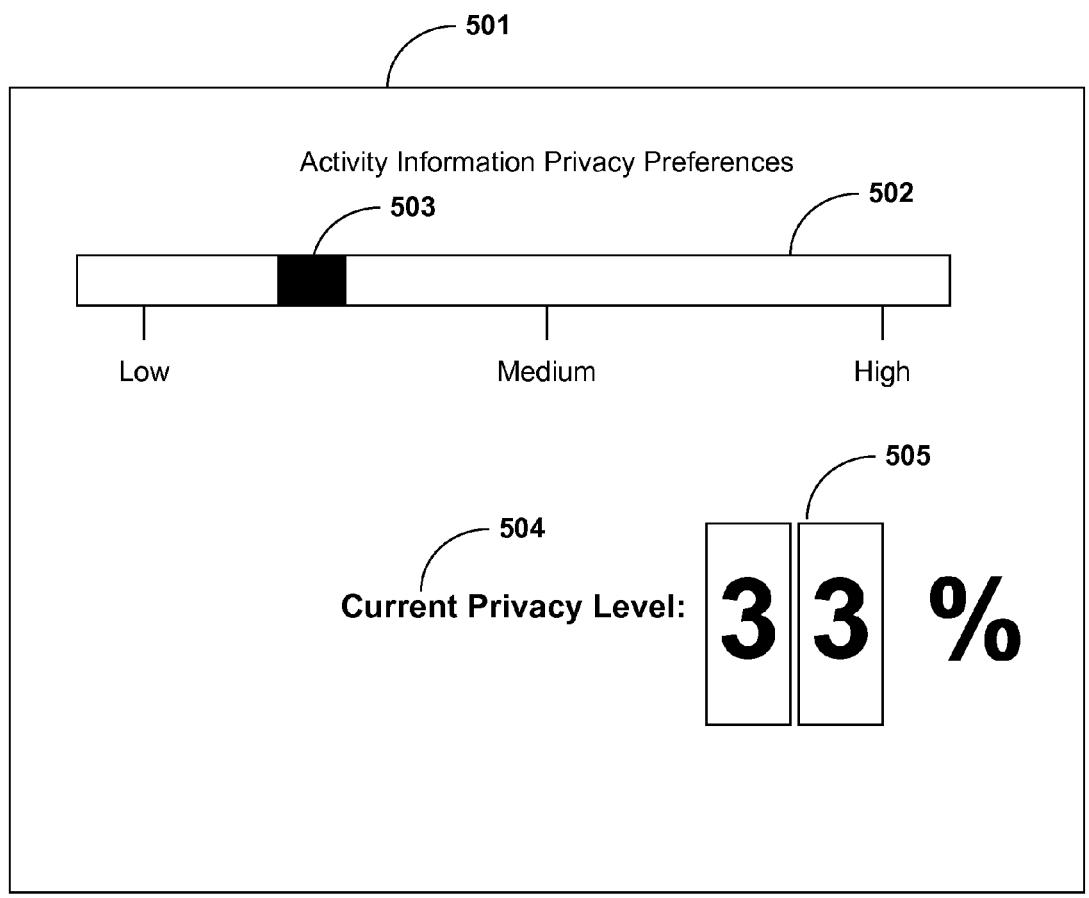
FIG. 5 is a sample screenshot of one embodiment of the present invention.

FIG. 5 is a screenshot of one embodiment of the invention. The screenshot 501 includes slider bar 502 with "low," "medium," and "high" selections, selector 503, a current privacy level notice 504, and a privacy level percentage 505. The screenshot in FIG. 5 may reside in program code on the search engine 104 from FIG. 1, or the screenshot may reside in program code on client device 101a, 101b, or 101c in FIG. 1.

The user of the embodiment depicted in FIG. 5 operates the slider bar 502 by selectively moving selector 503 to a desired privacy level. A desired privacy level may correspond to the amount or type of UAI ultimately sent to a third party.

The system may track user events based on keyboard and mouse inputs, the interactions on different types of websites such as travel or banking sites, and the time and date the information was tracked. In one example if the user moves selector 503 to "low" on slider bar 502 a majority of the UAI may be sent to a third party.

In another example, if the user moves selector 503 to "medium" on slider bar 502 the system may send a restricted amount of data to the third party, one example of the restricted data sent may be UAI collected from interactions with travel sites, but not UAI collected from interactions with banking sites.

In another example, if the user moves selector 503 to "high" on slider bar 502 the system may send a highly restricted set of UAI or no UAI to a third party. Alternatively, the "high" setting may trigger the user being presented with the individual UAI components that he wishes to send to a third party. The system may utilize further combinations of the amount and types of data sent to a third party in response to a user's privacy setting selection. A corresponding privacy level selected by moving selector 503 is depicted in this exemplary embodiment as a percentage at element 505.

Through the above-described system and method, users are presented with options and for allowing the tracking of their activities. In response to the tracking of their activities, users are presented with rewards, typically from third parties. The system and method provides a personalization firewall allowing for the user to personalize the firewall by adjusting the sensitivity to the type of information that is shared. The reward degree can mirror this sensitivity, in that if a user allows a greater degree of sharing, the user can receive a greater degree of reward and if the user does not wish to share any information, they have that option but at the cost of reward options. The above-described method and system thereby allows for user-control of tracking information and predicates that control level with incentives by parties wishing to acquire that information.

FIGS. 1 through 5 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A computerized method for rewarding a user for sharing activity information with a third party, the method comprising:
electronically receiving a user privacy preference that indicates a sensitivity level of activity information that the user is willing to share in response to a reward, a value of the reward based on a degree of the sensitivity level;
electronically setting a privacy setting for the user based on the received user privacy preference;
electronically tracking web browsing activity of the user during one or more web browsing sessions and generating therefrom user activity information by recording one or more web browsing events, each of the one or more web browsing events including the user's interaction with web content;
assigning a privacy score to each of the one or more web browsing events based on a sensitivity of the respective web browsing event that the user is willing to share;
filtering, the one or more web browsing events using the privacy scores assigned to the one or more web browsing events and a threshold value associated with the user privacy preference;
electronically sending a subset of the user activity information as a result of the filtering; and
providing a reward to the user based on the user activity information sent.

2. The method of claim 1 further comprising:
presenting the user with a plurality of privacy preferences; and
for each of the privacy preferences, presenting the value of the reward associated therewith.

3. The method of claim 2, wherein the presenting the user with a plurality of privacy settings includes a slide-bar user interface for a graphic adjustment of the privacy settings.

4. The method of claim 1, wherein the reward value is communicated to the user before receiving the privacy preference.

5. The method of claim 1, further comprising:
storing the recorded web browsing events in a log file.

6. The method of claim I, wherein the user activity information is sent to a third-party.

7. A system for rewarding a user for sharing activity information with a third party, the method comprising:
a computer readable medium having executable instructions stored thereon: and a processing device, in response to the executable instructions, operative to:
receive a user privacy preference that indicates a sensitivity level of activity information that the user is willing to share in response to a reward, a value of the reward based on a degree of the sensitivity level:
set a privacy setting for the user based on the received user privacy preference;
track web browsing activity of the user during one or more web-browsing sessions and generate therefrom user activity information by recording one or more web browsing events, each of the one or more web browsing events including the users interaction with web content;
assign a privacy score to each of the one or more web browsing events based on a sensitivity of each of the one or more web browsing events that the user is willing to share;
filter the one or more web browsing events using the privacy scores assigned to the one or more web browsing events and a threshold value associated with the user privacy preference;
send a subset of the user activity information as a result of the filtering; and
provide a reward to the user based on the user activity information sent.

8. The system of claim 7, wherein the processing device is further operative to:
present the user with a plurality of privacy preferences; and
for each of the privacy preferences, present the value of the reward associated therewith.

9. The system of claim 8, wherein the presenting the user with a plurality of privacy settings includes a slide-bar user interface for a graphic adjustment of the privacy settings.

10. The system of claim 7, wherein the reward value is communicated to the user before receiving the privacy preference.

11. The system of claim 7, the processing device further operative to:
store the recorded web browsing events in a log file.

12. The system of claim 7, wherein the user activity information is sent to a third-party.

13. A non-transitory computer readable medium having executable instructions stored thereon, which when executed by a processing device provides for a method for rewarding a user for sharing activity information with a third party, the method comprising:
computer program code for receiving a user privacy preference that indicates a sensitivity level of activity information that the user is willing to share in response to a reward, a value of the reward based on a degree of the sensitivity level;
computer program code for electronically setting a privacy setting for the user based on the received user privacy preference:
computer program code for electronically tracking web browsing activity of the user during one or more web-browsing sessions and generating therefrom user activity information by recording one or more web browsing events, each of the one or more web browsing events including the user's interaction with web content;
computer program code for assigning a privacy score to each of the one or more web browsing events based on a sensitivity ( )each of the one or more web browsing events that the user is willing to share;
computer program code for filtering the one or more web browsing events using the privacy scores assigned to the one or more web browsing events and a threshold value associated with the user privacy preference;
computer program code for electronically sending a subset of the user activity information as a result of the filtering; and
computer program code for providing a reward to the user based on the user activity information sent.

14. The computer readable medium of claim 13 further comprising:
computer program code for presenting the user with a plurality of privacy preferences; and
for each of the privacy preferences, computer program code for presenting the value of the reward associated therewith.

15. The computer readable medium of claim 14, wherein the computer program code for presenting the user with a plurality of privacy settings includes computer program code for a slide-bar user interface for a graphic adjustment of the privacy settings.

16. The computer readable medium of claim 13, wherein the reward value is communicated to the user before receiving the privacy preference.

17. The computer readable medium of claim 13, further comprising:

computer program code for storing the recorded web browsing events in a log file.

* * * * *